United States Patent
Kavc et al.

(10) Patent No.: US 6,209,935 B1
(45) Date of Patent: Apr. 3, 2001

(54) FRONT BUMPER ADJUSTABLE FASCIA

(75) Inventors: Andrew R. Kavc, Rochester Hills; William G. Gondert, Troy; Chad C. Baslock, Waterford; Gerald Thompson, Southfield; Jesse A. Harris, Waterford; Jonathan P. Varnhagen, West Bloomfield, all of MI (US); Glenn T. Nomi, Ballwin, MO (US); William C. Townsend, Highland; James L. Arnone, Chesterfield Township, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/359,972

(22) Filed: Jul. 23, 1999

(51) Int. Cl.$^7$ ..................................... B60R 19/24
(52) U.S. Cl. ............................. 293/155; 293/102
(58) Field of Search ............................. 293/53, 120, 155, 293/154, 102, 1; 296/180.1, 180.5

(56) References Cited

U.S. PATENT DOCUMENTS

| | | |
|---|---|---|
| 4,364,591 | 12/1982 | Bien . |
| 4,569,865 | 2/1986 | Placek . |
| 4,586,739 | 5/1986 | Loren et al. . |
| 4,613,177 | 9/1986 | Loren et al. . |
| 4,616,866 | 10/1986 | Loren et al. . |
| 4,635,984 | 1/1987 | Loren et al. . |
| 4,652,031 | 3/1987 | Loren et al. . |
| 4,722,563 | 2/1988 | Loren et al. . |
| 4,830,418 | 5/1989 | Gest . |
| 4,877,279 | 10/1989 | Logan . |
| 4,902,067 | * 2/1990 | Sakai et al. ........................ 296/180.1 |
| 4,941,701 | 7/1990 | Loren . |
| 4,998,761 | 3/1991 | Bayer et al. . |
| 5,029,920 | 7/1991 | Furuta et al. . |
| 5,046,776 | 9/1991 | Shaw . |
| 5,066,057 | 11/1991 | Furuta et al. . |
| 5,096,243 | 3/1992 | Gambinski . |
| 5,100,187 | 3/1992 | Loren . |
| 5,106,137 | 4/1992 | Curtis . |
| 5,108,138 | 4/1992 | Kawaguchi . |
| 5,183,303 | 2/1993 | Zoller . |
| 5,242,200 | * 9/1993 | Kamm et al. ..................... 293/154 X |
| 5,431,464 | 7/1995 | Jones et al. . |
| 5,533,780 | 7/1996 | Larson et al. . |
| 5,580,109 | 12/1996 | Birka et al. . |
| 5,628,536 | 5/1997 | Fulkerson . |
| 5,678,872 | 10/1997 | Slater . |
| 5,806,620 | 9/1998 | DeRees et al. . |

* cited by examiner

Primary Examiner—D. Glenn Dayoan
Assistant Examiner—Jason Morrow
(74) Attorney, Agent, or Firm—Roland A. Fuller, III

(57) ABSTRACT

The present invention provides an adjustable fascia for a bumper of a vehicle which has an upper fascia member and a lower fascia member detachably connected to the upper fascia member. The lower member can be adjusted relative to the upper member to maintain the uniformity and consistency of the gap. In another aspect of the present invention, the adjustable fascia has an upper fascia member having an upper series of alternating indentations and protrusions positioned along a face of the upper fascia. Likewise, the lower fascia member has a lower series of alternating indentations and protrusions. The lower series is positioned on a face of the lower fascia and is adapted to physically communicate with the upper series such that the indentations of the lower series receive the protrusions of the upper series and the indentations of the upper series receive the protrusions of the lower series. A fastener is provided to draw the lower series toward the upper series thereby affixing the upper fascia in place after it has been adjusted.

8 Claims, 2 Drawing Sheets

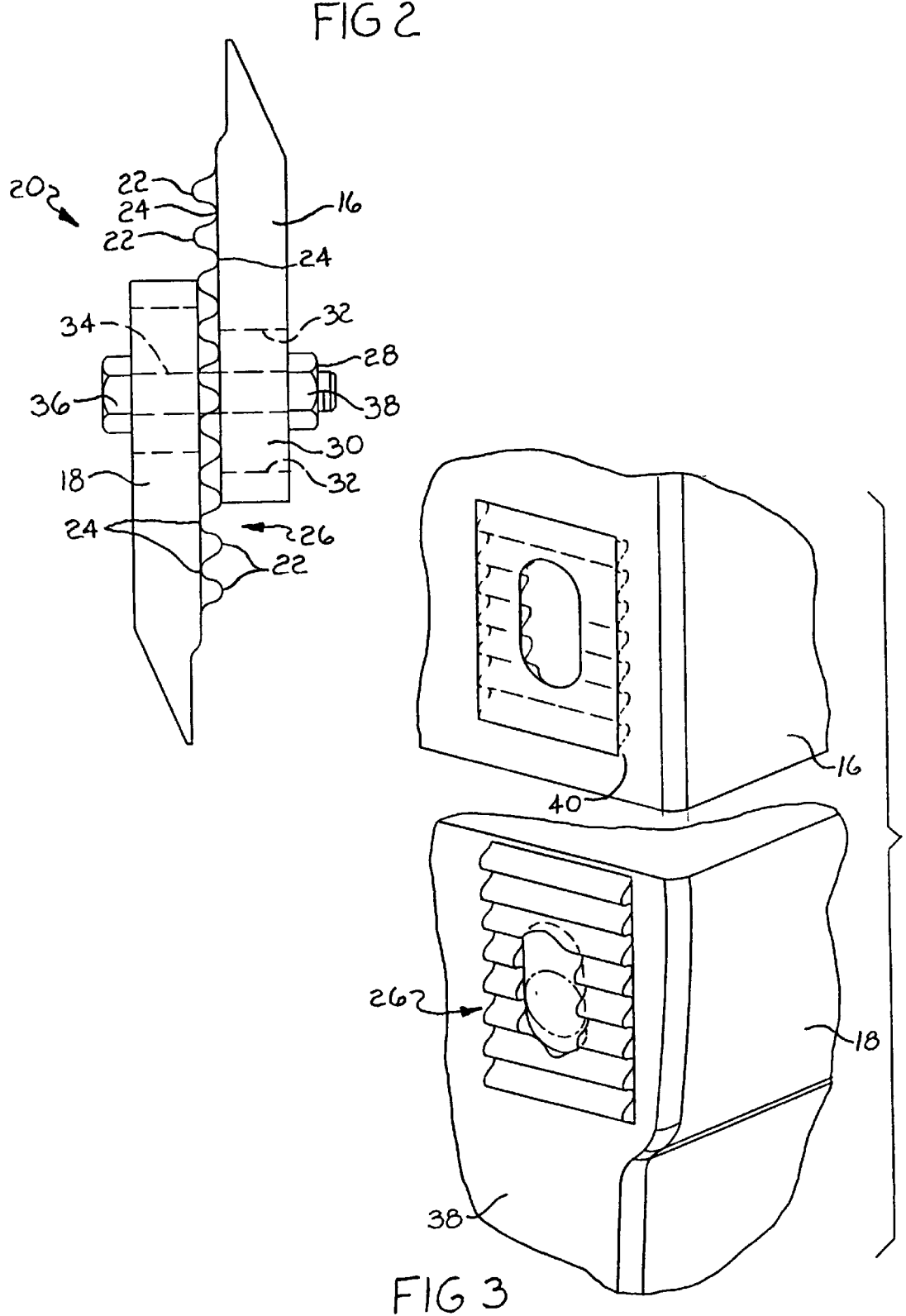

FRONT BUMPER ADJUSTABLE FASCIA

FIELD OF THE INVENTION

The present invention relates to a fascia for an automobile, and more particularly, a fascia for an automobile which can be adjusted for aesthetic appearance.

BACKGROUND OF THE INVENTION

In motor vehicles, bumper assemblies are employed to protect the vehicle body from minor bumps and typically include a flexible bumper fascia (which is the portion of the bumper assembly seen by the consumer) and a bumper shell for supporting and reinforcing the bumper fascia. The fascia, itself, comprises an upper and a lower portion. The upper portion covers the bumper shell and is rigidly attached to the lower fascia. The lower portion, in turn, is typically attached to the chassis.

Not only does the bumper assembly need to protect the vehicle body from minor bumps, it is also desirable that the bumper assembly be aesthetically-pleasing to the consumer. To achieve this aesthetic aspect, the upper portion of the fascia must be spaced from the vehicle's fender assembly by a predetermined gap. Uniformity of this gap between all points on the fender and upper fascia and consistency of this gap from vehicle to vehicle enhances the overall aesthetic appearance of the vehicle.

While manufacturers have attempted to provide the proper spacing between the upper portion and the fender, they have failed to address a variety of operational and assembly concerns regarding the above discussed alignment. This need manifests itself most specifically in the desire for manufacturing simplicity, cost savings, and operational simplicity. Specifically, when the gap between the upper fascia and the fender is out of tolerance, the upper fascia must be detached from the lower fascia and reattached when in the proper position, or must be modified or machined to set the proper gap. Because of the rigid attachment of the upper fascia to the lower fascia, modifying the gap is costly and difficult. In fact, modifying the gap typically requires adjustment at the assembly plant or dealership in response to a warranty claim, resulting in increased manufacturing or warranty cost.

SUMMARY OF THE INVENTION

In view of the above, it is an object of the present invention to provide an upper and lower fascia which can be adjusted both easily and cost effectively to allow adjustment of the gap between the upper fascia and fender of a vehicle.

Accordingly, the present invention provides an adjustable fascia for a bumper of a vehicle which has an upper fascia member and a lower fascia member detachably connected to the upper fascia member. The lower member can be adjusted relative to the upper member to maintain the uniformity and consistency of the gap between the upper fascia and fender.

In one aspect of the present invention, the upper fascia member has an upper series of alternating indentations and protrusions positioned along a face of the upper fascia. Similarly, the lower fascia member has a corresponding lower series of alternating indentations and protrusions. The lower series is positioned on a face of the lower fascia and is adapted to physically communicate with the upper series such that the indentations of the lower series receive the protrusions of the upper series and the indentations of the upper series receive the protrusions of the lower series. A fastener is provided to draw the lower series toward the upper series thereby affixing the upper fascia in place after it has been adjusted.

Further areas of applicability of the present invention will become apparent from the detailed description provided hereinafter. It should be understood, however, that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 2 is a cross-sectional view of an adjustable connection for an adjustable fascia according to the present invention;

FIG. 3 is a perspective view of an adjustable fascia according to the present invention.

DETAILED DESCRIPTION OF THE PREFERRED EMBODIMENTS

The following description of the preferred embodiments is merely exemplary in nature and is in no way intended to limit the invention, its application, or uses.

Figure 1:
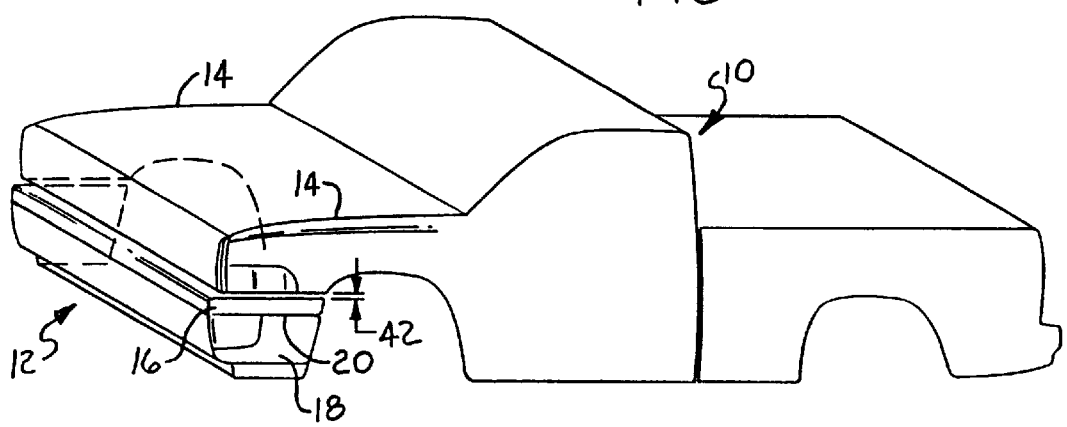
FIG. 1 is an environmental view of an adjustable fascia in conjunction with a vehicle according to the present invention.

FIG. 1 illustrates a bumper shell 12, constructed in accordance to teachings of the present invention, used in conjunction with a vehicle 10. Bumper shell 12 is mounted to the lower front area of vehicle 10 and is generally constructed as having a front face, positioned parallel and adjacent to the front of vehicle 10, and two parallel sides. Vehicle 10 has two fenders 14 positioned parallel to and above each respective parallel side of bumper shell 12.

With continued reference to FIG. 1, bumper shell 12, itself, is shown generally divided into two portions, comprising upper fascia 16 and lower fascia 18. Each respective fascia is shaped as bumper shell 12, each having a respective front face and two parallel sides. Lower fascia 18 is mounted to the vehicle chassis (not shown) and, in turn, provides support for upper fascia 16. Specifically, an adjustable connection 20 connects upper fascia 16 to lower fascia 18. Adjustable connection 20 can be any connection which allows adjustment of upper fascia 16 with respect to lower fascia 18 (for reasons which will be discussed.) However, it should be appreciated that the illustrated parallel configurations of each side of upper fascia 16 and lower fascia 18, as well as fenders 14, may be modified from that illustrated and described herein without departing from the scope of the invention defined by the appended claims. More particularly, it is contemplated that a variety of spacial relationships may exist between these elements while still permitting adjustable movement between the upper fascia 16 and lower fascia 18.

Referring now to FIG. 2, a preferred embodiment of adjustable connection 20 is shown and described. In FIG. 2, upper fascia 16 is shown positioned adjacent to lower fascia 18. Upper fascia 16 has an upper series 40 having a plurality of protrusions 22. Spacing between each protrusion 22 of upper series 40 forms corresponding indentations 24. Lower fascia 18, similar to upper fascia 16, has a lower series 26 which also has a plurality of indentations 24 and protrusions 22. For both upper series 40 and lower series 26, each protrusion 22 is slightly rounded and sized to fit within a corresponding indentation 24. As such, each protrusion 22 of upper series 40 fits within a corresponding indentation 24 of lower series 26, and each protrusion 22 of lower series 26 fits within a corresponding indentation 24 of upper series 40. As a result, upper series 40 and lower series 26 form a system of interlocking ribs. Thus, when upper series 40 is meshed with lower series 26, upper fascia 16 and lower fascia 18 are restricted from moving in the vertical direction with respect to each other. To maintain upper series 40 engaged to lower series 26, fastener 28, such as a pop rivet or threaded fastener, is positioned through an oval aperture 30 in upper fascia 16 and through circular aperture 34 in lower fascia 18.

Figure 4:
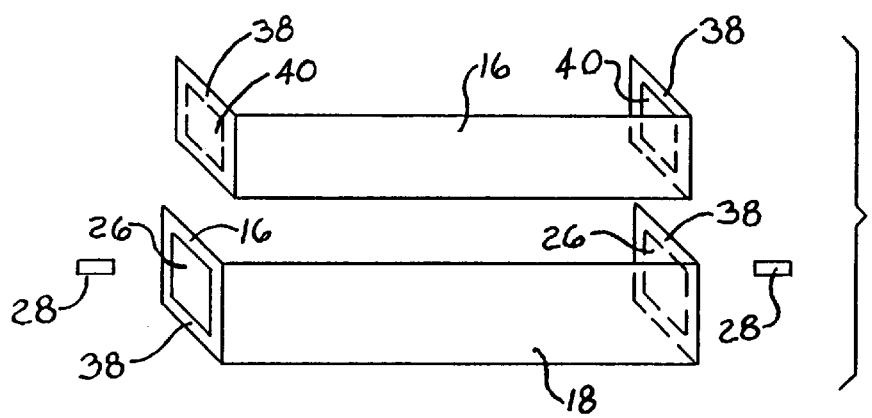
FIG. 4 is an exploded view of an adjustable fascia according to the present invention.

Referring now to FIGS. 3 and 4, an exploded view of bumper shell 12 is shown. As is clearly illustrated in FIG. 4, upper fascia 16 and lower fascia 18 each have parallel side portions 38, each having respective upper series 40 and lower series 26 mounted thereon. As such, lower series 26 is positioned on an external side 38 of lower fascia 18, and upper series 40 is positioned on an internal portion of upper fascia 16 as shown. When assembled, upper fascia 16 slides over lower fascia 18 until upper series 40 meshes with lower series 26. Then, fastener 28 can be used to secure upper series 40 to lower series 26.

With continued reference to FIGS. 2, 3, and 4, the operation and assembly of the present invention will now be described. When bumper shell 12 is assembled, upper fascia 16 is slid over the outer surface of lower fascia 18. Lower fascia 18 is then attached to vehicle 10 at the chassis or other rigid portion of vehicle 10. After attachment, upper fascia 16 is moved up or down, changing the indentations 24 in which each protrusion 22 lies, until gap 42 is set to a predetermined distance. Once set, fastener 28, such as a pop rivet or threaded member, is passed through oval aperture 30 and circular aperture 34 to ensure that upper series 40 remains meshed with lower series 26.

In FIG. 4, fastener 28 is illustrated as a pop rivet. If adjustment is desired after assembly, such as that associated with a warranty claim, fastener 28 need only be removed from oval aperture 30 and circular aperture 34. Then, upper fascia 16 may be adjusted up or down placing different indentations 24 with different protrusions 22 and thereby readjusting the position of upper fascia 16 to alter its spacial relationship with each fender 14, thereby adjusting gap 42. The oval shape of aperture 30 allows fastener 28, which has a cylindrical shape, to be slid up and down within aperture 30 and be repositioned within aperture 30. As a result, upper fascia 16 can be moved up and down with respect to lower fascia 18, yet still provide passage for fastener 28 for clamping upper series 40 to lower series 26.

While the above detailed description describes the preferred embodiment of the invention, it should be understood that the present invention is susceptible to modification, variation, and alteration without deviating from the scope and fair meaning of the following claims.

What is claimed is:

1. A selectively, vertically adjustable fascia for a vehicle having at least one fender, comprising:
   a lower fascia member; and
   an upper fascia member connected to said lower fascia member by an adjustable connection, said adjustable connection being adjustable such that said upper fascia member is selectively vertically adjustable along multiple vertical positions with respect to said lower fascia member.

2. The selectively, vertically adjustable fascia as claimed in claim 1, said upper fascia member is positioned adjacent to and spaced from the at least one fender by a predetermined gap.

3. A selectively, vertically adjustable fascia for a vehicle having at least one fender, comprising:
   an upper fascia member having at least an upper series of alternating indentations and protrusions positioned along at least one face of said upper fascia member;
   a lower fascia member having at least a lower series of alternating indentations and protrusions positioned along at least one face of said lower fascia member, said lower series adapted to physically communicate with said upper series such that at least a portion of said indentations of said lower series receive at least a portion of said protrusions of said upper series and at least a portion of said indentations of said upper series receive at least a portion of said protrusions of said lower series; and
   a fastener adapted to draw said lower series toward said upper series for interlocking said upper series with said lower series;
   wherein said upper fascia member is selectively vertically adjustable with respect to said lower fascia member.

4. The selectively, vertically adjustable fascia as claimed in claim 3, wherein said fastener is a pop rivet, said pop rivet being inserted through an aperture in said lower series and an aperture in said upper series, said pop rivet drawing said upper series toward said lower series for interlocking said upper series with said lower series.

5. The selectively, vertically adjustable fascia as claimed in claim 4, wherein said aperture in said lower series is ovally shaped, whereby said pop rivet is able to be moved vertically along said aperture in said lower series allowing said upper fascia member and said pop rivet to be vertically repositioned with respect to said lower fascia member.

6. The selectively, vertically adjustable fascia as claimed in claim 3, wherein said upper series and said lower series comprise a plurality of locking ribs.

7. The selectively, vertically adjustable fascia as claimed in claim 3, further comprising a second upper series and a second lower series, said upper fascia member and said lower fascia member each having respective sets of parallel sides substantially co-planar with the at least one fender of the vehicle, said upper series and said second upper series positioned on respective opposing sides of said upper fascia member and said lower series and said second lower series positioned on respective opposing sides of said lower fascia member, whereby said upper series forms a set of interlocking ribs with said lower series and said second upper series forms a second set of interlocking ribs with said second lower series.

8. A method for assembling a selectively, vertically adjustable fascia to a vehicle having at least one fender, comprising the steps of:
   a. providing an upper fascia member and a lower fascia member, said upper fascia member connected to said lower fascia member by at least one adjustable connection, said upper fascia member and said lower fascia member having respective sets of parallel sides;
   b. mounting said lower fascia member to the vehicle such that said parallel sides of said upper fascia member are positioned adjacent to and substantially co-planar to the at least one fender of the vehicle; and
   c. adjusting said adjustable attachment to set a predetermined gap between said parallel sides of said upper fascia member and the at least one fender;
   wherein said upper fascia member is selectively vertically adjustable with respect to said lower fascia member.

\* \* \* \* \*